May 18, 1926.

W. E. KERSHAW ET AL 1,585,500

BATTERY CELL FILLER

Filed July 8, 1922

WITNESS:
Rob R Litchel

INVENTORS
William Ernest Kershaw
and Carroll Hodge
BY
Augustus B. Stoughton
ATTORNEY.

Patented May 18, 1926.

1,585,500

UNITED STATES PATENT OFFICE.

WILLIAM ERNEST KERSHAW, OF PHILADELPHIA, AND CARROLL HODGE, OF RADNOR, PENNSYLVANIA.

BATTERY CELL FILLER.

Application filed July 8, 1922. Serial No. 573,749.

The principal object of the present invention is to provide a battery cell filler embodying in its construction a signalling device and a fluid control valve and yet small enough to be inserted into battery jars placed in inaccessible locations. Another object of the invention is to provide a battery cell filler of relatively small size, small enough to be grasped in the palm of the hand, and fitted with a control valve and signal operated by a battery that can be carried in the pocket so that the device is readily portable and especially useful where the battery installation provides comparatively little space.

Other objects of the invention will appear from the following description at the end of which the invention will be claimed, but the invention will be first described with reference to the accompanying drawings forming part hereof and in which—

Figure 1:
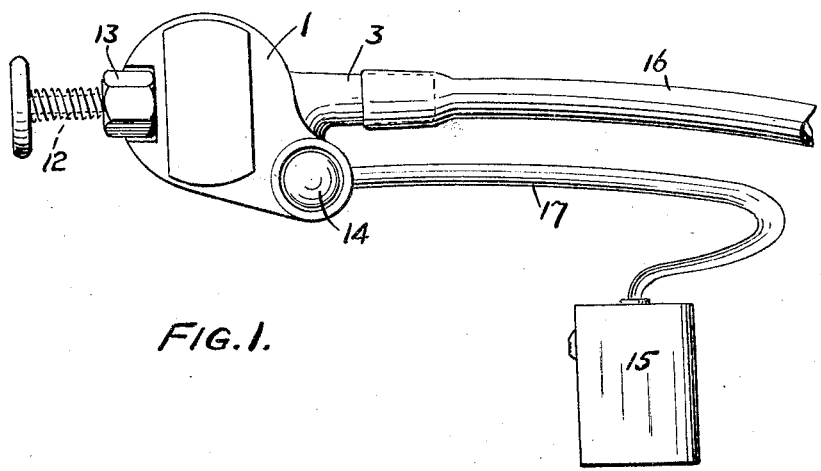
Figure 2:
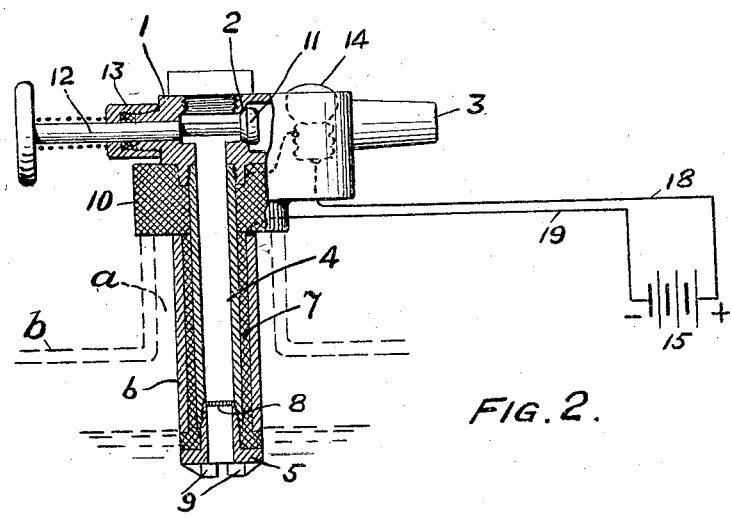

Figure 1 is a top or plan view showing the filler proper in full size and the battery about half size, and Fig. 2 is a generally central sectional view of Figure 1, showing the signal lamp in dotted lines.

In the drawings 1 is an angle-bend fitting including a valve seat 2 and a fluid inlet 3 and a fluid outlet nozzle tube 4 adapted for insertion into the filling opening a of a battery jar b. The nozzle tube is provided with contacts 5 and 6 insulated from each other by a sleeve 7 mounted on the tube 4. As shown the contact 5 is detachably connected by a screw thread with the interior of the tube 4, and it is provided with a foraminous portion 8 to oppose drip and with projections 9 to insure a free outlet. The parts 4 and 5 may be made in one piece but there is an advantage in having the part 5 detachable so that it can be renewed. 10 is a body as of wood and insulating material, and it surrounds and is slightly larger than the nozzle tube so that in size the body is adapted to be grasped in the palm of the hand in order to permit of the insertion of the nozzle into the filling opening of inconveniently located or crowded battery jars. 11 is a spring closed valve co-operating with the valve seat 2 and having its stem 12 accessible through the body or, more accurately, through the gland 13. 14 is a lamp mounted in and visible from the exterior of the body which is shown as bulged for its accommodation. 15 is a battery adapted to be carried in the pocket so that the filler is conveniently carried about within the reach of the length of the fluid supply tube 16. There are circuit connections which include a flexible cable 17, and these circuit connections may be traced from the positive side of the battery by conductor 18 through the lamp 14 to the tube 4 and contact 5, and from the negative side of the battery by the conductor 19 to the sleeve which constitutes the contact 6. When the level of fluid in the battery reaches the contact 6, the circuit is made by the described path and the lamp is lighted to give a signal. The flow of fluid is controlled by manipulation of the valve 11 which manipulation can be made in response to the signal.

We claim:

1. A battery cell filler comprising in combination an angle-bend fitting including a valve seat and a fluid inlet in confronting relation and a fluid outlet nozzle tube extending at right-angles to the axis of the inlet and seat and adapted for insertion into the filling opening of a battery jar and provided with contacts insulated from each other, an insulating body enclosing a portion of the angle-bend of the fitting and slightly larger than the nozzle tube and adapted to be grasped in the palm of the hand, a spring closed valve co-operating with the seat and having its stem accessible through the body, a lamp mounted in and visible from the exterior of the body, a battery adapted to be carried in the pocket, and circuit connections through the lamp to the contacts and including a flexible cable from the batttery to the body and in line with the axis of the inlet and seat, substantially as described.

2. A battery cell filler comprising in combination an angle-bend fitting including a valve seat and a fluid inlet and a fluid outlet nozzle tube adapted for insertion into the filling opening of a battery jar and provided with contacts insulated from each other, a body enclosing the angle-bend of the fitting and slightly larger than the nozzle tube and adapted to be grasped in the palm of the hand, a spring closed valve co-operating with the seat and having its stem accessible through the body, a lamp mounted in a bulge provided on the body and said lamp visible from the exterior of the body, a battery adapted to be carried in the pocket, and circuit connections through the lamp to the contacts and including a flexible cable from the battery to the body, substantially as described.

3. A battery cell filler comprising in combination a fitting including a valve seat and a fluid inlet and a fluid outlet nozzle tube adapted for insertion into the filling opening of a battery jar and provided with contacts insulated from each other, an insulating body enclosing the fitting and slightly larger than the nozzle tube and adapted to be grasped in the palm of the hand, a valve co-operating with the seat and having its stem accessible through the body arranged crosswise of the nozzle and in line with the inlet, a lamp mounted in and visible from the exterior of the body, a battery adapted to be carried in the pocket, and circuit connections through the lamp to the contacts and including a flexible cable from the battery to the body, substantially as described.

WILLIAM ERNEST KERSHAW.
CARROLL HODGE.